United States Patent
Pandey et al.

(10) Patent No.: US 9,305,125 B2
(45) Date of Patent: Apr. 5, 2016

(54) INTEGRATED CIRCUIT DESIGN TIMING PATH VERIFICATION TOOL

(71) Applicants: Vipin Pandey, Ghaziabad (IN); Sidhartha Taneja, New Delhi (IN)

(72) Inventors: Vipin Pandey, Ghaziabad (IN); Sidhartha Taneja, New Delhi (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 140 days.

(21) Appl. No.: 14/195,815

(22) Filed: Mar. 3, 2014

(65) Prior Publication Data

US 2015/0248513 A1 Sep. 3, 2015

(51) Int. Cl.
*G06F 17/50* (2006.01)

(52) U.S. Cl.
CPC .......... *G06F 17/5031* (2013.01); *G06F 17/505* (2013.01); *G06F 2217/84* (2013.01)

(58) Field of Classification Search
CPC .................................................. G06F 17/5031
USPC ....................................................... 716/108
See application file for complete search history.

(56) References Cited

U.S. PATENT DOCUMENTS

| | | | |
|---|---|---|---|
| 6,983,437 B2 | 1/2006 | Lauritzen et al. | |
| 7,941,773 B2 | 5/2011 | Tanaka | |
| 8,209,648 B1 | 6/2012 | Ku et al. | |
| 8,640,066 B1 * | 1/2014 | Gupta et al. | 716/108 |

OTHER PUBLICATIONS

Kai Yang and Kwang-Ting Cheng, "Efficient Identification of Multi-Cycle False Path", Asia and South Pacific Conference on Design Automation, Jan. 24-27, 2006, pp. 360-365. IEEE 2006.

* cited by examiner

*Primary Examiner* — Thuan Do
(74) *Attorney, Agent, or Firm* — Charles E. Bergere

(57) ABSTRACT

An EDA tool for validating predefined timing paths having corresponding timing constraints in an integrated circuit (IC) design has a processor that performs a static-timing-analysis (STA) of the IC design and generates a STA report that includes the first set of timing constraints, which include a first number of clock cycles required for propagating the first multi-cycle timing path. A simulation-based checker based on a STA that counts a second number of clock cycles that is actually required by the first multi-cycle timing path to propagate is generated while performing a unit-delay, gate-level netlist simulation of the first-multiple cycle timing path. The first set of timing constraints then are modified so that the first multi-cycle timing path is redefined to require the second number of clock cycles to propagate.

8 Claims, 3 Drawing Sheets

INTEGRATED CIRCUIT DESIGN TIMING PATH VERIFICATION TOOL

BACKGROUND OF THE INVENTION

The present invention relates generally to integrated circuit design tools, and, more particularly to an integrated circuit design timing path verification tool.

An application-specific integrated circuit (ASIC) design flow includes several stages and begins with a design entry stage in which an integrated circuit (IC) design is defined using a hardware description language (HDL). The design entry stage is followed by a logic synthesis stage in which HDL (Verilog) and logic synthesis tools, such as an RTL Compiler (RC) are used to generate a netlist that includes a description of each digital logic element and its connections in the IC design. This is followed by a pre-layout simulation stage that validates the operation of the IC design by running unit-delay, gate-level netlist simulation on the IC design. During this netlist simulation, each digital logic element is assigned a propagation delay of exactly one simulation time-unit. The pre-layout simulation is followed by floor planning, placement and routing stages in which the generated netlist is arranged on a die and additional routing connections are made. Finally, post-layout simulation is performed with delays for each logic element being back-annotated from the floor planning stage.

Upon completion of the design stage, the IC design is verified for timing performance by checking all possible timing violations in all possible timing paths that connect any two flip-flops in the IC design. The timing paths include digital logic elements, such as AND, NAND, and NOR gates, and other combinational logic circuits. One type of timing analysis includes static timing analysis (STA). During STA, each timing path is verified for timing violations using an external clock as a reference, and timing constraints for each timing path are stored in an STA report.

Timing paths are generally of two types: single-cycle and multi-cycle timing paths. If a data signal crosses a timing path within one clock cycle of the external clock signal, the path is defined as a single-cycle timing path, and if the data signal requires more than one clock cycle of the external clock signal to cross the path, the path is defined as a multi-cycle timing path.

Sometimes single-cycle timing paths are erroneously defined as multi-cycle timing paths, and vice-versa. There are several reasons for such incorrect definitions, such as a knowledge gap due to lack of accurate design constraints or involvement of third party vendors in design verification stages. Also, sometimes the number of clock cycles required to propagate a multi-cycle timing path is incorrectly defined. For example, a multi-cycle timing path that requires four clock-cycles to propagate may be wrongly defined to require five clock-cycles to propagate.

Such incorrect multi-cycle exceptions are caught late in the design cycle while performing back-annotated post-layout timing simulation during the post-layout simulation stage. In back annotation, propagation delays corresponding to the digital logic elements of a timing path are fetched from a source file (e.g., a Synopsis delay format (SDF) file), applied to the netlist, and then the IC design is simulated. Wrongly defined timing paths are identified and the STA constraints for those paths are modified. Since the STA constraints have been modified, the IC design has to undergo the entire ASIC design flow once again, which is time-consuming and significantly delays chip tape-out.

Therefore, it would be advantageous to have a system and method that successfully validates an IC design and detects wrongly defined multi-cycle timing paths, and detects wrong multi-cycle exceptions at an earlier stage in the ASIC design flow.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
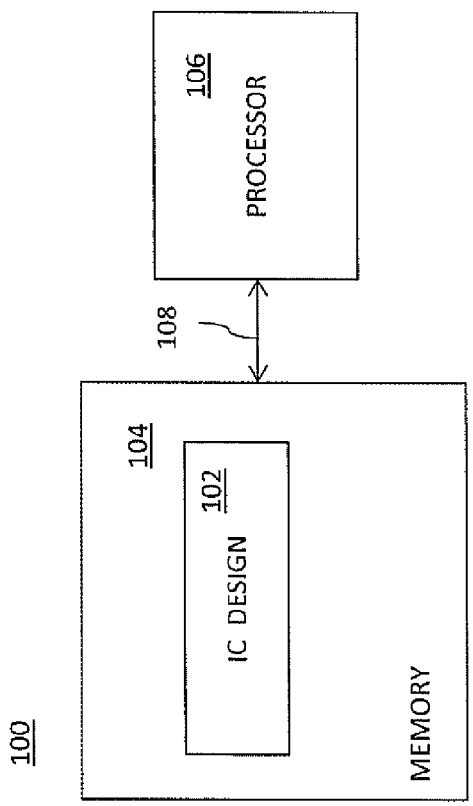
FIG. 1 is a schematic block diagram of an electronic design automation (EDA) tool for validating a plurality of timing paths of an integrated circuit design in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for validating an integrated circuit design using an electronic design automation (EDA) tool is provided. The integrated circuit design includes a plurality of predefined timing paths. The plurality of predefined timing paths has a corresponding plurality of timing constraints and each timing path includes a plurality of digital logic elements. The EDA tool includes a memory and a processor. The memory stores the integrated circuit design. The processor, which is in communication with the memory, receives a first set of timing constraints corresponding to a first multi-cycle timing path of the plurality of predefined timing paths. The first multi-cycle timing path includes a first set of digital logic elements and requires a first number of clock cycles to propagate for a signal to propagate across the path. The processor performs a unit-delay, gate-level netlist simulation of the first multi-cycle timing path to validate the first multi-cycle timing path and the first set of timing constraints and determines that the first multi-cycle timing path requires a second number of clock cycles for a signal to propagate across the path. The processor modifies the first set of timing constraints to redefine the first multi-cycle timing path to require the second number of clock cycles. The integrated circuit design then is modified accordingly. In various embodiments of the present invention, an integrated circuit is fabricated using the modified integrated circuit design.

Various embodiments of the present invention provide a method for validating an integrated circuit design using an electronic design automation (EDA) tool. The integrated circuit design includes a plurality of predefined timing paths. The timing paths have a corresponding plurality of timing constraints. Each timing path includes a plurality of digital logic elements. The integrated circuit design is stored in a memory of the EDA tool. A processor of the EDA tool receives a first set of timing constraints corresponding to a first multi-cycle timing path of the plurality of predefined timing paths. The first multi-cycle timing path includes a first set of digital logic elements and it takes a first number of clock cycles for a signal to propagate across the predefined path. The processor performs a static-time-analysis (STA) of the integrated circuit design and generates a STA timing report that stores the first set of timing constraints and instances of the first set of digital logic elements. The processor validates the first multi-cycle timing path and the first set of timing constraints by performing a unit-delay, gate-level netlist simulation of the first multi-cycle timing path. The processor generates a simulation-based checker that is based on the STA and integrates the simulation-based checker with the unit-delay, gate-level netlist simulation. The simulation-based checker counts a number of clock cycles of the external clock signal that is actually required for propagation of the signal over the first multi-cycle timing path. When the processor determines that the first multi-cycle timing path actually requires a second number of clock cycles for the signal to propagate there-across, the processor modifies the first set of timing constraints to redefine the first multi-cycle timing path to require the second number of clock cycles. Therefore, any wrong multi-cycle exception of the first multi-cycle timing path is detected early in the design flow, which reduces the time and effort required to modify the first set of timing constraints. The simulation-based checker further identifies a digital logic element of the first multi-cycle timing path through which the signal fails to propagate, thereby indicating that the corresponding functional pattern suite of the integrated circuit design is inadequate to exercise the first multi-cycle timing path completely and unable to determine a number of clock cycles required for propagation of the signal over the first multi-cycle timing path. Thus, as opposed to conventional systems that detect wrong multi-cycle exceptions at a later stage (typically during back annotated post-layout simulations), the EDA tool of the present invention detects incorrect multi-cycle exceptions at a very early stage in the design flow (during unit delay gate-level netlist simulation), thereby avoiding any delay in tape-out.

Referring now to FIG. 1, a schematic block diagram of an electronic design automation (EDA) tool 100 for validating a plurality of timing paths of an integrated circuit design 102 in accordance with an embodiment of the present invention is shown. The EDA tool 100 includes a memory 104 and a processor 106 in communication with the memory 104, such as by using a bus 108. The memory 104 receives and stores the integrated circuit (IC) design 102. The IC design 102 may include any circuit design that includes digital logic elements. Examples of digital logic elements include AND, OR, NOT, NOR, NAND, NOR, XOR, and XNOR gates, sequential elements including flip-flops, shift-registers, multiplexers, demultiplexers and combinational logic circuits that include combinations of the above-mentioned gates. Examples of the IC design 102 include microprocessor, microcontroller unit (MCU), system-on-chip (SOC), and application specific integrated circuit (ASIC) designs.

The processor 106 and memory 104 comprise a computer system that can range from a stand-alone personal computer to a network of processors and memories, to a mainframe system. The computer system must be able to run verification tools that can simulate digital and analog circuits, such as Incisive™ Unified Simulator (IUS) by Cadence Design Systems, Inc. Such tools and computer systems are known to those of skill in the art. In addition, since the present invention includes a method or sequence of steps performed by the EDA tool 100, then sequence or method steps may be defined herein as structure using means-for language. Such structural elements defined using means-for language relate to the processor 106 and the software being executed by the processor 106 to perform such steps. While processors and software are known, the processor embodies the structures defined using the means-for language when the defined steps are being performed.

The IC design 102 includes a plurality of timing paths that connect internal flip-flops. A data signal propagates across a timing path by moving from one flip-flop to the next, i.e., from a source flip-flop to a destination flip-flop, as well as through any digital logic elements between the flip-flops. It may take a single cycle or multiple cycles of an external clock signal for the signal to propagate from the first flip-flop to the second flip-flop; thus the path may be a single-cycle path or a multi-cycle path, respectively. The timing paths are predefined as either single cycle or multi-cycle by an IC designer.

Typically, a designer identifies and specifies timing constraints for various timing paths of the IC design 102. During static-timing-analysis (STA), the timing constraints are manually provided to the EDA tool 100. The timing constraints include timing parameters such as the number of clock cycles of the external clock signal that is required for a signal to traverse a timing path, etc. The processor 106 provides an external clock signal to the digital logic elements of the IC design 102, statically verifies timing performance based on the provided timing constraints, and identifies the propagation delay of each of the digital logic elements in the timing path. Upon completion of the STA, the processor 106 generates a STA timing report that includes the timing constraints and instances of the digital logic elements of each timing path.

The processor 106 then performs a unit-delay, gate-level netlist simulation of the IC design 102. During the unit-delay, gate-level netlist simulation, the processor 106 validates each multi-cycle timing path by performing a unit-delay simulation. The processor 106 selects a first multi-cycle timing path that includes a first set of digital logic elements and that requires a first number of clock cycles for a signal to propagate across the path according to the STA timing report. The processor 106 then performs a unit-delay, gate-level netlist simulation on the first multi-cycle timing path. The processor 106 generates a simulation-based checker based on the STA timing report to validate the first multi-cycle timing path according to the corresponding timing constraints stored in the STA timing report. In an embodiment of the present invention, the simulation-based checker may be a Verilog checker. The multi-cycle timing path is validated when outputs of successive digital logic elements of the first multi-cycle timing path occur one simulation time-unit delay apart and reach the input of the destination flip-flop. If a number of clock cycles required to reach the input of the second flip-flop is less than the first number of clock cycles, then the path is determined to have a wrong multi-cycle exception (having a first number of clock cycles).

To validate the first multi-cycle timing path, the processor 106 integrates the simulation-based checker with the unit-delay, gate-level netlist simulation. During the unit-delay, gate-level netlist simulation, each digital logic element of the first set of digital logic elements is assigned a propagation delay of exactly one simulation time-unit. The simulation-based checker counts a number of clock cycles of the external clock signal that is actually required to propagate the first multi-cycle timing path. If the number of clock cycles counted by the simulation-based checker matches the first number of clock cycles, then the processor 106 generates a simulation log file containing a PASS status message. The PASS status message indicates that the first set of timing constraints is correctly defined in the STA timing report and the processor 106 continues validation of rest of the multi-cycle timing paths of the integrated circuit design 102.

However, if there is a mismatch between the number of clock cycles counted by the simulation-based checker and the first number of clock cycles, then the processor 106 generates a simulation log file containing a FAIL status message. The FAIL status message indicates that the first set of timing constraints is incorrectly defined in the STA timing report and the first multi-cycle timing path actually requires a second number of clock cycles (as counted by the simulation-based checker) for a signal to propagate across the timing path. The processor 106 then redefines the first multi-cycle timing path to take the second number of clock cycles by modifying the first set of timing constraints.

The simulation-based checker also validates a functional pattern suite of the first multi-cycle timing path. If the signal fails to propagate across the first multi-cycle timing during the unit-delay, gate-level netlist simulation, the simulation-based checker generates an interrupt report that indicates a position of the digital logic element where the signal ended (propagated to), indicating that the functional pattern suite fails to exercise the first multi-cycle path completely.

Figure 2:
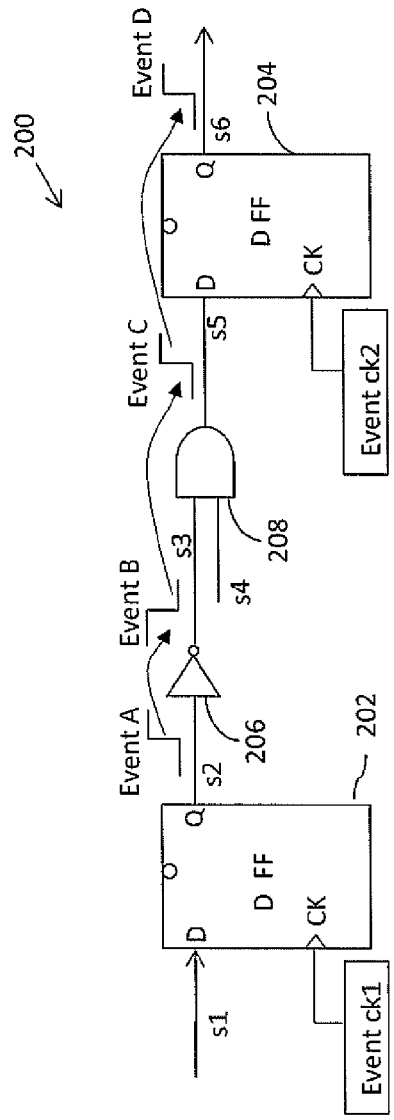
FIG. 2 is a schematic block diagram of an exemplary multi-cycle timing path of an initial integrated circuit design in accordance with an embodiment of the present invention.

FIG. 2 is a schematic block diagram of an exemplary multi-cycle timing path 200 in accordance with an embodiment of the present invention. The multi-cycle timing path 200 includes first and second D flip-flops 202 and 204 that form the source and destination flip-flops and a NOT gate 206 and an AND gate 208 connected between the flip-flops 202 and 204. The first D flip-flop 202 has a data input terminal connected to a previous timing path for receiving a data signal s1, a clock terminal connected to a clock source (not shown) for receiving an input clock signal and an output terminal for outputting a data signal s2. The NOT gate 206 is connected to the first D flip-flop 202 and receives the data signal s2 as an input and generates a data signal s3 as an output. The AND gate 208 has a first input terminal connected to the NOT gate 206 for receiving the data signal s3, a second input terminal connected to a digital logic element of the previous timing path for receiving a data signal s4 and an output terminal for generating a data signal s5. The second D flip-flop 204 has a data input terminal connected to the AND gate 208 for receiving the data signal s5, a clock terminal connected to the clock source for receiving the input clock signal and an output terminal for generating a data signal s6.

Figure 3:
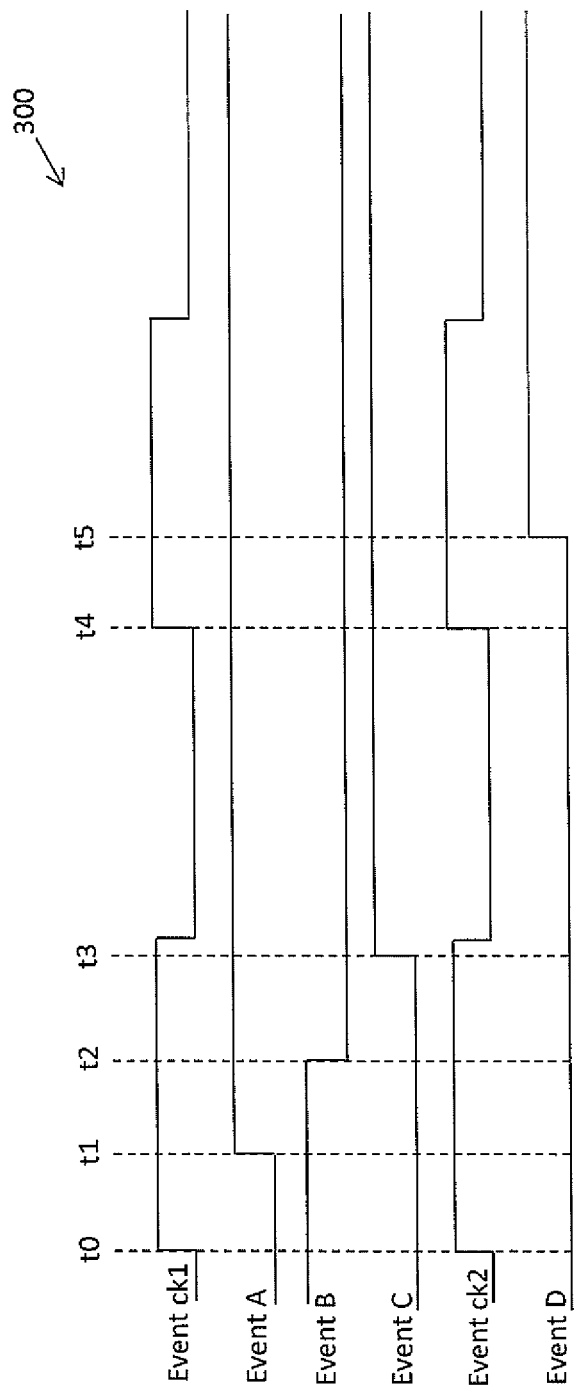
FIG. 3 is a timing diagram illustrating propagation of the exemplary multi-cycle timing path of the initial integrated circuit design of FIG. 2, in accordance with an embodiment of the present invention.

FIG. 3 is a timing diagram 300 illustrating propagation of the data signals s1 through s6 in the multi-cycle timing path 200. The transition of the data signals sl through s6 across the digital logic elements of the first multi-cycle timing path 200 has been referred to as events. As shown in FIG. 3, event ck1 corresponds to gating of the first D flip-flop 202, event A corresponds to transition of the data signal s2, event B corresponds to transition of the data signal s3, event C corresponds to transition of the data signal s5, event ck2 corresponds to gating of the second D flip-flop 204, and event D corresponds to transition of the data signal s6.

The processor 106 initially performs the STA of the multi-cycle timing path 200 and generates the STA timing report that stores the first set of timing constraints. The first set of timing constraints includes timing parameters corresponding to a first number of clock cycles of the external clock signal that is required for propagation of the multi-cycle timing path 200. The STA timing report also stores instances of the AND gate 208 and the NOT gate 206. In the current example, the first number of clock cycles is determined to be three based on the first set of timing constraints. Upon completing the STA, the processor 106 performs the unit-delay, gate-level netlist simulation on the multi-cycle timing path 200 using the Verilog checker.

During the unit-delay, gate-level netlist simulation, when the first D flip-flop 202 receives the signal s1 (time instance t0), event ck1 occurs, which represents clocking of the first D flip-flop 202. Event A occurs (time instance t1) one simulation time-unit after the occurrence of event ck1 and corresponds to outputting of the signal s2 by the first D flip-flop 202. Event B occurs (time instance t2) one simulation time-unit after the occurrence of event A and corresponds to outputting of the signal s3 by the NOT gate 206. Event B is succeeded by event C (time instance t3) after one simulation time-unit delay and corresponds to outputting of the signal s5 by the AND gate 208. Event ck2 (time instance t4) occurs after two clock cycles of the external clock signal and corresponds to clocking of the second D flip-flop 204. Event D (time instance t5) follows event ck2 after one simulation time-unit delay and corresponds to outputting of the output signal s6 by the second D flip-flop 204.

Thereafter, the Verilog checker calculates a number of clock cycles of the external clock signal required to generate events ck1 through ck2 during the unit-delay, gate-level netlist simulation as two (first clock cycle from time instance t0 to t4 and second clock cycle from time instance t4 onwards), hereafter referred as a second number of clock cycles. The processor 106 identifies a mismatch between the first and second number of clock cycles, indicating that the timing parameters of the first set of timing constraints are incorrectly defined in the STA timing report. Subsequently, the processor 106 modifies the first set of timing constraints such that the multi-cycle timing path 200 is now redefined to require the second number of clock-cycles for propagation.

If event C does not occur one simulation time-unit after the occurrence of event B, the processor 106 determines the functional pattern suite for the multi-cycle timing path 200 to be inadequate to validate the multi-cycle timing path 200. In such a case, the Verilog checker interrupts the unit-delay, gate-level netlist simulation and generates the interrupt report indicating the position of the AND gate 208 where the functional pattern suite has failed.

Figure 4:
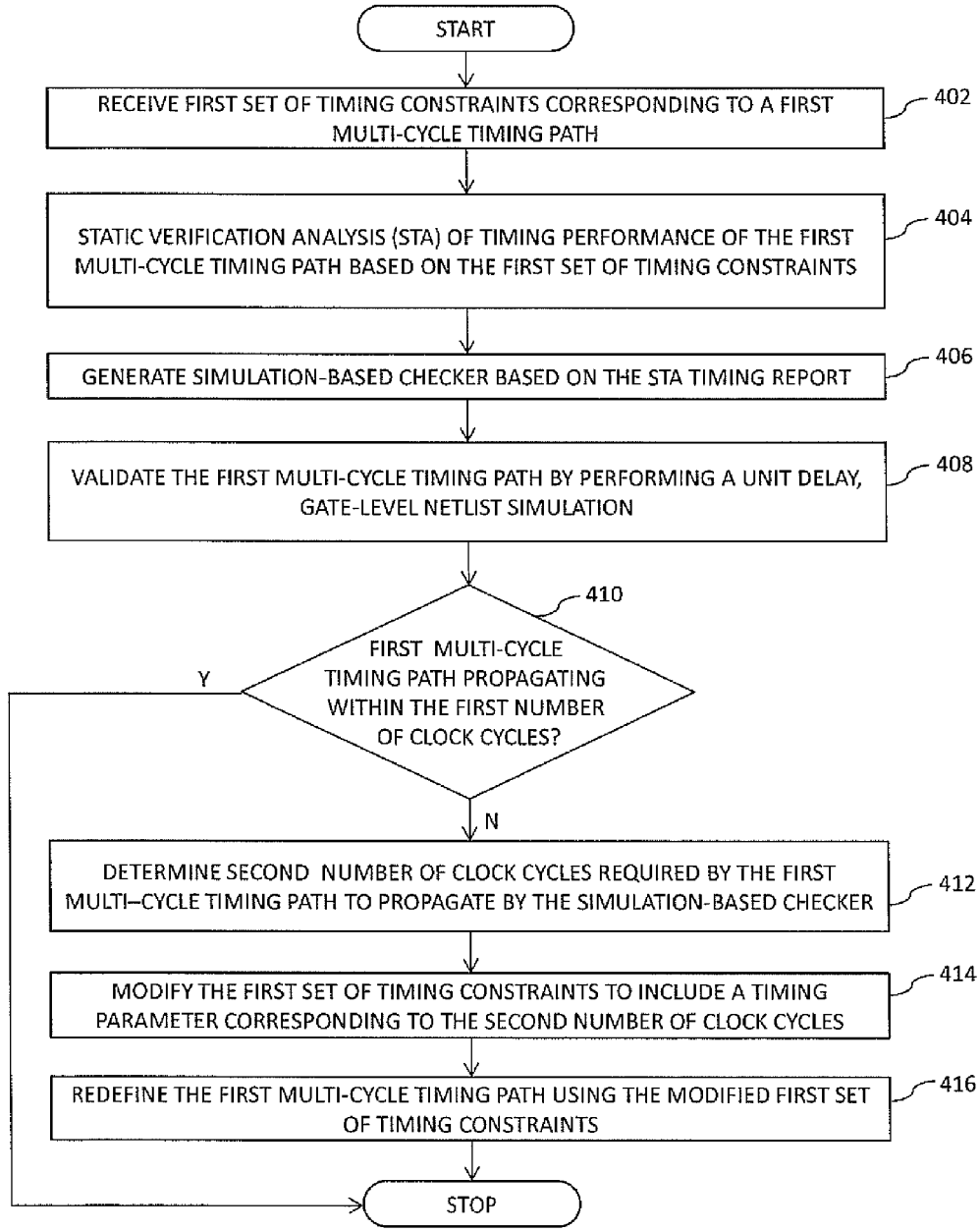
FIG. 4 is a flow chart illustrating a method for validating a plurality of timing paths of an integrated circuit design in accordance with an embodiment of the present invention.

Referring now to FIG. 4, a flow chart illustrating a method for validating the plurality of timing paths of the integrated circuit design 102 in accordance with an embodiment of the present invention is shown. At step 402, the processor 106 receives the first set of timing constraints corresponding to the first multi-cycle timing path. The first multi-cycle timing path includes a first set of digital logic elements and requires a first number of clock cycles for a signal to propagate across the path. At step 404, the processor 106 performs STA of the first multi-cycle timing path and statically verifies timing performance of the first multi-cycle timing path based on the first set of timing constraints. The first set of timing constraints includes timing parameters corresponding to the first number of clock cycles of the external clock signal and is saved in the STA timing report. At step 406, the processor 106 generates a simulation-based checker. At step 408, the processor 106 validates the first multi-cycle timing path by performing the unit-delay, gate-level netlist simulation. The processor 106 integrates the simulation-based checker with the unit-delay, gate-level netlist simulation.

At step 410, the processor 106 determines whether the signal propagates across the first multi-cycle timing path within the first number of clock cycles based on the unit-delay, gate-level netlist simulation. If at step 410 it is determined that the first multi-cycle timing path requires the first number of clock-cycles for the signal to propagate across the path, then the processor 106 proceeds to validate the next multi-cycle timing path. However, if at step 410 it is determined that the first multi-cycle timing path does not require the first number of clock cycles for the signal to propagate across the path, then step 412 is executed.

At step 412, the simulation-based checker determines that the first multi-cycle path requires the second number of clock cycles of the external clock signal for propagation. At step 414, the processor 106 modifies the first set of timing constraints to include timing parameters corresponding to the second number of clock cycles. At step 416, the processor 106 redefines the first multi-cycle timing path using the modified first set of timing constraints such that the first multi-cycle timing path now requires the second number of clock cycles for the signal to propagate across the path. Thereafter, the processor 106 repeats the above-mentioned process for the remaining timing paths of the IC design 102.

Thus, according to the above-described method, the multi-cycle exception for STA (one of the STA timing parameters) is changed. As will be understood by those of skill in the art, once the timing parameter is changed, then the IC design must be modified to conform to the new timing constraints. That is, since the new STA constraints would be more stringent, the IC design must be changed so that the new timing requirements are met. While changing the design is not necessarily easy, the method is well understood by those of skill in the art.

The modified integrated circuit design then is used to fabricate an integrated circuit using known processes (i.e., the necessary design data files are sent to a fabrication facility and the integrated circuit is fabricated on a semiconductor wafer).

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for validating a plurality of predefined timing paths of an integrated circuit design, wherein each timing path includes a plurality of digital logic elements, and wherein for the plurality of predefined timing paths there is a corresponding plurality of timing constraints, the EDA tool comprising:
a memory that stores the integrated circuit design; and
a processor in communication with the memory, wherein the processor includes:
means for receiving a first set of timing constraints corresponding to a first multi-cycle timing path of the plurality of predefined timing paths, wherein the first multi-cycle timing path includes a first set of digital logic elements and requires a first number of clock cycles for a signal to propagate there-across;
means for validating the first multi-cycle timing path and the first set of timing constraints by performing a unit-delay, gate-level netlist simulation of the first multi-cycle timing path;
means for performing a static-timing-analysis (STA) of the integrated circuit design and generating a STA timing report that includes the first set of timing constraints and instances of the first set of digital logic elements;
means for generating a simulation-based checker based on the STA timing report and integrating the simulation-based checker with the unit-delay, gate-level netlist simulation;
means for determining that the first multi-cycle timing path requires a second number of clock cycles for the signal to propagate there-across, wherein the first and second numbers of clock cycles correspond to clock cycles of an external clock signal used to simulate the integrated circuit design,
wherein the simulation-based checker validates the first multi-cycle timing path by counting a number of clock cycles of the external clock signal required for the signal to propagate across the first multi-cycle timing path and invalidates the first multi-cycle timing path when the first multi-cycle timing path requires the second number of clock cycles for the signal to propagate across the first multi-cycle timing path during the unit-delay, gate-level netlist simulation,
wherein the simulation-based checker generates an interrupt report when the signal stops propagating across the first multi-cycle timing path, and wherein the interrupt report indicates a position of a digital logic element of the first set of digital logic elements to which the first multi-cycle timing path is exercised;
means for redefining the first multi-cycle timing path to take the second number of clock cycles for the signal to propagate there-across by modifying the first set of timing constraints; and
means for generating a simulation log file upon completing the unit-delay, gate-level netlist simulation, and wherein the simulation log file includes a PASS status message when the first multi-cycle timing path is successfully validated by the simulation-based checker, and a FAIL status message when the first multi-cycle timing path is invalidated by the simulation-based checker, during the unit-delay, gate-level netlist simulation.

2. The EDA tool of claim 1, wherein the first set of timing constraints includes a timing parameter corresponding to the first number of clock cycles.

3. The EDA tool of claim 1, wherein the FAIL status message indicates that the first set of timing constraints is incorrectly defined.

4. The EDA tool of claim 3, wherein the processor includes means for modifying the first set of timing constraints by including a timing parameter corresponding to the second number of clock cycles.

5. A method for validating a plurality of predefined timing paths of an integrated circuit design, wherein each timing path includes a plurality of digital logic elements, and wherein the plurality of predefined timing paths have a corresponding plurality of timing constraints, using an electronic design automation (EDA) tool that includes a memory for storing the integrated circuit design and a processor in communication with the memory, the method comprising;
receiving, by the processor, a first set of timing constraints corresponding to a first multi-cycle timing path of the plurality of predefined timing paths, wherein the first multi-cycle timing path includes a first set of digital logic elements, and wherein the first set of timing constraints include a first number of clock cycles for a signal to propagate across the first multi-cycle timing path;

validating, by the processor, the first multi-cycle timing path and the first set of timing constraints by performing a unit-delay, gate-level netlist simulation of the first multi-cycle timing path;

performing a static-time-analysis (STA) of the integrated circuit design and generating a STA timing report that includes the first set of timing constraints and instances of the first set of digital logic elements;

generating, by the processor, a simulation-based checker based on the STA timing report and integrating the simulation-based checker with the unit-delay, gate-level netlist simulation performed by the processor;

determining that the first multi-cycle timing path requires a second number of clock cycles for the signal to propagate there-across, wherein an external clock signal is used to simulate the integrated circuit design, wherein the first and second number of clock cycles correspond to clock cycles of the external clock signal;

validating the first multi-cycle timing path by the simulation-based checker by counting a number of clock cycles of the external clock signal required for a signal to propagate across the first multi-cycle timing path and invalidating the first multi-cycle timing path, by the simulation-based checker, when the signal takes the second number of clock cycles to propagate across the first multi-cycle timing path during the unit-delay, gate-level netlist simulation;

generating an interrupt report, by the simulation-based checker, when the signal stops propagating across the first multi-cycle timing path, and wherein the interrupt report indicates a position of a digital logic element of the first set of digital logic elements to which the first multi-cycle timing path is exercised;

generating a simulation log file, by the processor, upon completing the unit-delay, gate-level netlist simulation, wherein the simulation log file includes a PASS status message when the first multi-cycle timing path is successfully validated by the simulation-based checker and a FAIL status message when the first multi-cycle timing path is invalidated by the simulation-based checker, during the unit-delay, gate-level netlist simulation; and redefining the first multi-cycle timing path to require the second number of clock cycles for the signal to propagate there-across by modifying the first set of timing constraints.

6. The method of claim 5, wherein the FAIL status message indicates that the first set of timing constraints is incorrectly defined.

7. The method of claim 6, further comprising modifying the first set of timing constraints, by the processor, by including a timing parameter corresponding to the second number of clock cycles.

8. A method for manufacturing an integrated circuit, comprising:

validating a plurality of predefined timing paths of an initial integrated circuit design using an electronic design automation (EDA) tool that includes a memory for storing the initial design and a processor in communication with the memory, wherein each of the predefined timing paths includes a plurality of digital logic elements, and a corresponding plurality of timing constraints, wherein validating the plurality of predefined timing paths comprises:

receiving a first set of timing constraints corresponding to a first multi-cycle timing path of the plurality of predefined timing paths, wherein the first multi-cycle timing path includes a first set of digital logic elements and the first set of timing constraints includes a first number of clock cycles that it takes for a signal to propagate across the first multi-cycle timing path;

validating the first multi-cycle timing path and the first set of timing constraints by performing a unit-delay, gate-level netlist simulation of the first multi-cycle timing path;

performing a static-time-analysis (STA) of the integrated circuit design and generating a STA timing report that includes the first set of timing constraints and instances of the first set of digital logic elements;

generating, by the processor, a simulation-based checker based on the STA timing report and integrating the simulation-based checker with the unit-delay, gate-level netlist simulation performed by the processor;

determining that the first multi-cycle timing path requires a second number of clock cycles for a signal to propagate there-across;

redefining the first multi-cycle timing path to take the second number of clock cycles for the signal to propagate there-across, by modifying the first set of timing constraints, thereby modifying the initial design; and saving the modified initial design in the memory; and fabricating the integrated circuit using the modified initial design.

* * * * *